United States Patent [19]
Leitz

[11] 4,206,365
[45] * Jun. 3, 1980

[54] OPTICAL CORRELATOR

[75] Inventor: Ludwig Leitz, Wetzlar, Fed. Rep. of Germany

[73] Assignee: Ernst Leitz Wetzlar GmbH, Wetzler, Fed. Rep. of Germany

[ * ] Notice: The portion of the term of this patent subsequent to Nov. 28, 1995, has been disclaimed.

[21] Appl. No.: 909,764

[22] Filed: May 26, 1978

Related U.S. Application Data

[62] Division of Ser. No. 759,571, Jan. 14, 1977, Pat. No. 4,127,778.

[30] Foreign Application Priority Data

Jan. 17, 1976 [DE] Fed. Rep. of Germany ....... 2601642
Feb. 9, 1976 [DE] Fed. Rep. of Germany ....... 2604926

[51] Int. Cl.² ............................................. G02B 27/38
[52] U.S. Cl. ................................ 250/550; 250/237 G; 350/162 SF; 356/28
[58] Field of Search .......................... 250/237 G, 550; 350/162 SF; 356/28, 28.5

[56] References Cited

U.S. PATENT DOCUMENTS

| | | | |
|---|---|---|---|
| 3,550,085 | 12/1970 | Silverman | 365/120 X |
| 3,599,147 | 8/1971 | Rogers et al. | 350/162 SF X |
| 3,711,200 | 1/1973 | Maughmer | 356/28.5 |
| 3,820,896 | 6/1974 | Stavis | 356/28.5 |
| 3,888,589 | 6/1975 | Swift | 356/28 |

*Primary Examiner*—James B. Mullins
*Attorney, Agent, or Firm*—Gilbert L. Wells

[57] ABSTRACT

The invention relates to an optical correlator comprising an optical system for imaging an object space, a spatial frequency filter disposed in or close by the image plane, and at least one photoelectric detector assigned to said spatial frequency filter. According to the invention the spatial frequency filter is a raster, the structures of which extend in the direction of the perspective vanishing lines of the image of the object space and/or perpendicularly to at least one of said vanishing lines. The size of the structure elements and/or the distance between the elements constituting the raster structure are chosen according to the distortion of the perspective image.

12 Claims, 6 Drawing Figures

OPTICAL CORRELATOR

This is a division of application Ser. No. 759,571, filed Jan. 14, 1977, U.S. Pat. No. 4,127,778.

BACKGROUND OF THE INVENTION

The field of the invention is the technique of measuring the velocity of object movements by means of an optical correlator.

More precisely, the present invention relates to an optical correlator comprising an optical system for producing an image of an object space, a spatial frequency filter arranged in or close by the image plane, and at least one photoelectric detector associated with the spatial frequency filter.

Optical correlators of this basic design are used for many different kinds of measurements of movements and distances. They, further, serve to monitor rooms, as for example disclosed in U.S. Pat. No. 3,972,021. The spatial frequency filters used for image correlation always have a constant periodic structure with regard to the measuring coordinate in a given measuring field. If an object moves in a direction perpendicular to the direction of observation of the correlator a measuring signal is obtained of which the frequency and/or the amplitude is proportional to the velocity of the object, as described in the copending patent application Ser. No. 623,559, of Heitmann et al, filed Oct. 17, 1975, and now abandoned assigned to the same assignee as the present application.

It is, however, a disadvantage of such measurements that, if the object movement is not strictly perpendicular to the direction of observation, but extends in an inclined direction towards the observer a measuring signal is obtained which creates the wrong impression of an increasing velocity, that increases the more the closer the object comes, depending on the perspective enlargement of the object and on the changing angular velocity with regard to the observer. In the co-pending patent application Ser. No. 671,104, of Leitz et al, filed Mar. 29, 1976, and now abandoned also assigned to the assignee of the present application, it is already suggested to derive from the measured change in velocity a measurement signal that is indicative for the approach of the object.

A change of the perspective size of the object also occurs if the object moves directly in the direction of observation. If for measurement an optical correlator is used which includes a spatial frequency filter having a constant periodic structure here again the wrong impression of a change of the object velocity would be created. To overcome this disadvantage it is already suggested in the patent application Ser. No. 623,559 to use for the spatial frequency filter an arcuate division which is not linear with regard to adjacent division lines. Thereby a uniform and velocity proportional measuring signal may be obtained from an object movement in a direction perpendicular to the lines of division.

In many cases it is desired to measure object movements in different object spaces and in different object distances. Since a certain distinct surface portion of the spatial frequency filter is assigned to each object space by the imaging system of the optical correlator it has been suggested in patent application Ser. No. 671,104 to subdivide the spatial frequency filter into different portions having divisions of different grating constants and to assign different photoelectric detectors to each portion. The changes in the measuring signal caused by the perspective enlargement of the object image are also present in this case. During the evaluation of the measuring signals these changes are to be taken into account by a suitable selection of staggeredly in series located object spaces and by a suitable interrogation of the measuring signals. Difficulties do occur, however, with regard to the limitation of adjacent object spaces and also with regard to the discrimination of object movements during the transition from one object into the other.

It is, therefore, an object of the present invention to make a better use of the correlation of perspective criteria of the object and its paths of travel during the imaging and the optical filtering in the optical correlator. It is a particular object to provide a simple manner of distinguishing in the image between relative movements in the direction of the perspective vanishing lines and relative movements transverse thereto.

SUMMARY OF THE INVENTION

According to the invention the above stated objects are attained by a spatial frequency filter in the form of a raster of which the structures extend in the direction of the perspective vanishing lines of the image of the object space and/or perpendicular to at least one of said vanishing lines. In a specific embodiment the raster structures may extend in the direction of the vanishing lines of a central perspective. The size of the elements constituting the structure and/or the distance between these elements may be chosen to suit the distortion of the perspective image. Particular advantages are obtained if at least portions of the raster structures are photoelectric detectors. For generating measuring signals that are correct in sign it is advantageous if the spatial frequency filter is made pivotable about an axis which is normal to the image plane and extends through the vanishing point of the central perspective.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
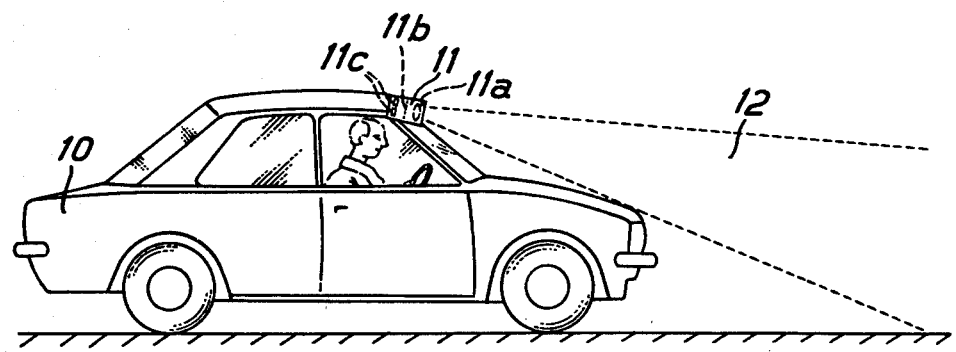
FIG. 1 shows an optical correlator mounted in a vehicle.

Referring now to the drawings, FIG. 1 shows a vehicle 10 wherein an optical correlator 11 is mounted, comprising an imaging optic 11a, a spatial frequency filter 11b, and a photoelectric detector 11c. The reception angle 12 of the correlator 11 is adjusted to cover the object space in the direction of travel of the vehicle.

Figure 2:
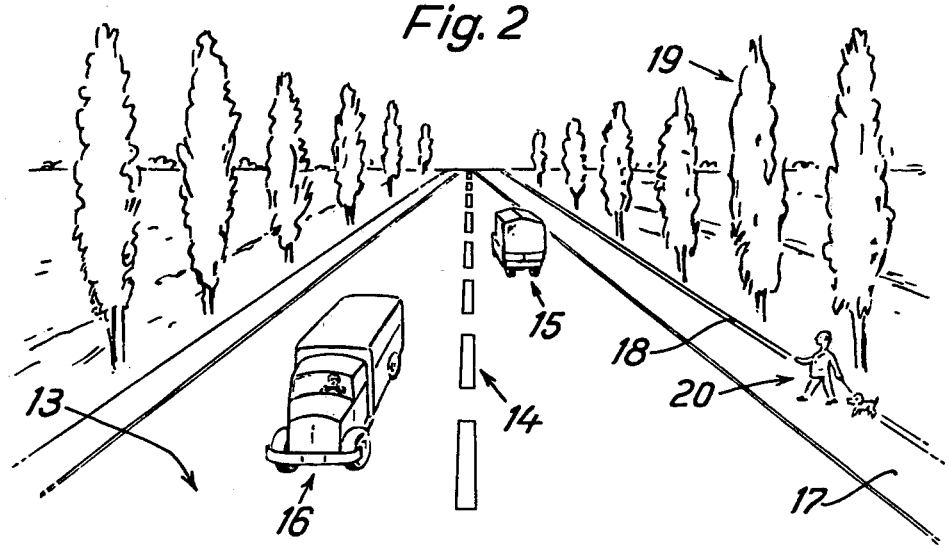
FIG. 2 shows the object space covered by the optical correlator.

The image produced by the imaging optic 11a will then, for example, look as illustrated in FIG. 2.

In FIG. 2 there is shown a road surface 13 that is subdivided into two lanes for opposite directions of travel by a dotted line 14. The vehicle 10 shown in FIG. 1 drives in the right-hand lane. In front of vehicle 10 there drives another vehicle 15, and on the left-hand lane there approaches a vehicle 16. On the right-hand side of the right-hand lane there is a strip of loose gravel 17 which is bordered by a channel 18. Adjacent thereto there is a row of trees out of which a pedestrian with a dog steps out.

From the illustration it will be comprehended that the dotted line 14, the rims of the lanes, the channel 18, and the feet of the trees are arranged along vanishing lines which all extend in the direction towards a not shown common vanishing point located in the horizon of the image. From the length and the distance of the dots of the dotted line 14 it will be clear that such bordering lines which run in parallel to the horizon are located closer together as a result of the perspective imaging.

As the vehicle 10 drives along this image of the object space moves across the spatial frequency filter 11b arranged in or close by the image plane of the imaging optic 11a of the optical correlator 11. In a known manner this causes a modulation of the light flux passing through the spatial frequency filter. From this modulation information may be obtained in a likewise known manner on movements relative to the object space.

For example the following measuring tasks may be handled:

(a) all transverse movements originating out of the space on the right-hand side of the road are to be evaluated;

(b) the movements on the other line are to produce a signal only if a movement is directed towards the vehicles own lane;

(c) an approach to, and the velocity of such approach, the vehicle 15 driving in front of vehicle 10 is to be determined (or to an obstacle in the lane).

In all of these measuring tasks the changes in size within the object space caused by the perspective influence the measuring signals if constantly periodically rastered spatial frequency filters are used. It will be comprehended, however, that such influence is compensated with movements in the direction of the vanishing lines if spatial frequency filters according to the invention, as shown in FIGS. 3a and 3b, are used.

Figure 3A:
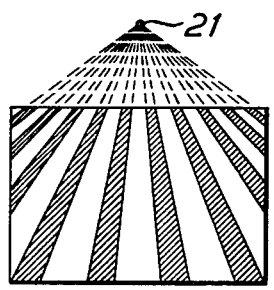
FIG. 3a shows a spatial frequency filter in the form of an amplitude grating having grating lines converging in the direction of a common vanishing point.

FIG. 3a shows an amplitude grating of which the structure elements are alternating opaque and transparent grating lines. All grating lines extend in the direction of a common point 21 which corresponds, for example, to the vanishing point of the illustration shown in FIG. 2. The width of the opaque grating lines and the distances between these lines corresponds to a perspective image of a grating on the road surface, which grating extends in the direction of travel and consists of parallel lines. It should be noticed, however, that in addition to the geometric perspective there occurs a further projective distortion, owing to the fact that—as illustrated in FIG. 1—object and image plane are inclined to each other. A possible unsharp image resulting therefrom may be avoided by observing the well-known Scheimpflug-condition.

Figure 3B:
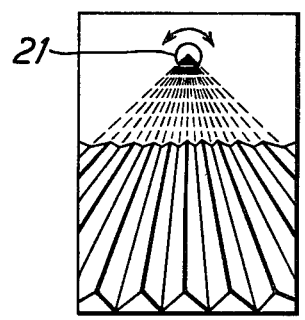
FIG. 3b shows a spatial frequency filter in the form of a phase grating.

FIG. 3b shows a phase grating constructed in accordance with the same principles. Here, the structure elements are prisms extending perspectively in the direction to the common vanishing point 21. The area of the cross-section of the prisms and the distances of the prism edges vary and are distorted according to a perspective image.

It will be readily understood that a distant object of which the image in the area close to the vanishing point fits, for example, exactly on one transparent grating line between two adjacent opaque grating lines of a spatial frequency filter as shown in FIG. 3a, does not create any modulation of the light flux when moving in parallel to the vanishing lines because the change in size of the grating structure matches exactly the change in size of the image. On the other hand, the same object creates always the same optimal modulation of the light flux, independently from its distance, when moving perpendicularly to the direction of the grating lines.

Figure 4:
FIG. 4 shows a spatial frequency filter having structures that extend perpendicularly to a vanishing line and are perspectively distorted in dimension and distance.

The spatial frequency filter shown in FIG. 4 is an embodiment of which the raster structures extend perpendicularly to a central vanishing line. The widths and the distances of the shown amplitude structures again correspond to the distortion of a perspective image. A spatial frequency filter of this type has the advantage that only object movements in parallel to the vanishing lines generate a light flux modulation which is independent from the perspective variations in size.

Figure 5:
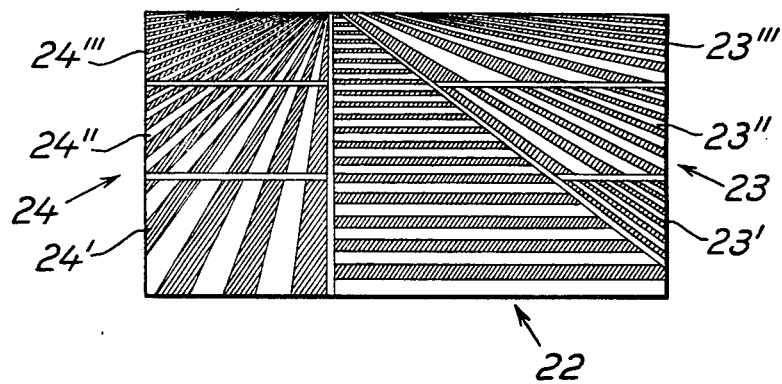
FIG. 5 shows a spatial frequency filter adapted to suit the covered object space.

If, now, the above described basic structures of the FIGS. 3 and 4 are applied to the image of the object space as shown in FIG. 2, this will result in a spatial frequency filter of a type as, for example, shown in FIG. 5, by means of which the above stated measuring tasks may be accomplished.

The spatial frequency filter shown in FIG. 5 comprises in its central area 22 structures for measuring the relative movements of objects in the vehicles own lane. The raster structures extend perpendicularly to the vanishing line of the dotted line 14. However, instead of using the dotted line 14 as the reference line, the outer border line of the road surface may also be chosen as such reference line.

In the areas 23; 24 which are adjacent to one central area 22 on the left-hand side and on the right-hand side only such movements are of interest which are in progress in a direction towards the road. Object spaces in different distances are to be evaluated separately. To this end it is advisable to further subdivide the areas 23 and 24 in sub-areas 23'; 23''; 23''' and 24'; 24''; 24'''. The spatial frequencies of the raster structures of such sub-areas may be chosen to be different. Photoelectric detectors may be assigned to each sub-area in a known manner.

In order to reproduce the movements correct in sign in the various sub-areas it is already known to superimpose an additional movement of the spatial frequency filter on the relative movement between the image and the spatial frequency filter. If an invented spatial frequency filter as shown in the FIGS. 3a and 3b is used it will prove advisable to choose the vanishing point 2i as the pivot for the additional spatial frequency filter movement. This can be accomplished by providing a shaft that substantially intersects the vanishing point. Thereby it is ensured that the ratio of size between the image and the raster structure is maintained during the movement of the spatial frequency filter.

In a further embodiment of the invention the raster structures and the assigned photoelectric detectors may be included in one element. This can be done by providing photosensitive layers on the opaque lines. Such an embodiment is useful if relatively coarse raster structures are sufficient for the spatial frequency filter. This may be the case if the correlation is to be established relative to markers that are present in the object space, e.g. on runways of airports, street markers etc.

What is claimed is:

1. An optical correlator having an imaging optic for imaging an object space having lines vanishing in the direction of the horizon into an image plane and a spatial frequency filter arranged substantially in said image plane and at least one photoelectric detector assigned to said spatial frequency filter, wherein the improvement comprises:

said spatial frequency filter in the form of a raster having structure elements which extend in said direction of the vanishing lines of the image of the object space.

2. An optical correlator as claimed in claim 1, wherein the raster structure elements extend in the direction of the vanishing lines of a central perspective.

3. An optical correlator as claimed in claim 2, wherein the spatial frequency filter is pivotable about an axis which extends substantially normal to the image plane and substantially intersects the vanishing point of the central perspective.

4. An optical correlator as claimed in claim 1, wherein at least portions of the structure elements are photoelectric detectors.

5. An optical correlator having an imaging optic for imaging an object space having lines vanishing in the direction of the horizon into an image plane and a spatial frequency filter arranged substantially in said image plane and at least one photoelectric detector assigned to said spatial frequency filter, wherein the improvement comprises:

said spatial frequency filter in the form of a raster having structure elements which extend in a direction perpendicular to at least one of said vanishing lines of the image of the object space.

6. An optical correlator as claimed in claim 5, wherein at least portions of the structure elements are photoelectric detectors.

7. An optical correlator as claimed in claim 5, wherein the vanishing lines to which the structure elements extend in a perpendicular direction are the vanishing lines of a central perspective.

8. An optical correlator as claimed in claim 7, wherein the spatial frequency filter is pivotable about an axis which extends substantially normal to the image plane and substantially intersects the vanishing point of the central perspective.

9. An optical correlator having an imaging optic for imaging an object space having lines vanishing in the direction of the horizon into an image plane and a spatial frequency filter arranged substantially in said image plane and at least one photoelectric detector assigned to said spatial frequency filter, wherein the improvement comprises:

said spatial frequency filter in the form of a single raster having structure elements with a first part of said structure elements which extends in the direction of said vanishing lines of the image of the object space and a second part of said structure elements which extends in a direction perpendicularly to at least one of said vanishing lines.

10. An optical correlator as claimed in claim 9, wherein the raster structure elements extend in the direction of the vanishing lines of a central perspective.

11. An optical correlator as claimed in claim 10, wherein the spatial frequency filter is pivotable about an axis which extends substantially normal to the image plane and substantially intersects the vanishing point of the central perspective.

12. An optical correlator as claimed in claim 9, wherein at least portions of the structure elements are photoelectric detectors.

* * * * *